(12) United States Patent
Cheng et al.

(10) Patent No.: US 9,673,731 B2
(45) Date of Patent: Jun. 6, 2017

(54) PARALLEL INVERTER SYSTEM, AND SHUTDOWN CONTROL METHOD AND SHUTDOWN CONTROL DEVICE FOR PARALLEL INVERTER SYSTEM

(71) Applicant: Sungrow Power Supply Co., Ltd., Hefei, Anhui (CN)

(72) Inventors: Lin Cheng, Anhui (CN); Nianan Pan, Anhui (CN); Zhicheng Wang, Anhui (CN); Lei Tao, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/920,217

(22) Filed: Oct. 22, 2015

(65) Prior Publication Data
US 2016/0118909 A1    Apr. 28, 2016

(30) Foreign Application Priority Data
Oct. 24, 2014    (CN) .......................... 2014 1 0577198

(51) Int. Cl.
*H02M 1/36*    (2007.01)
*H02M 7/493*    (2007.01)
(Continued)

(52) U.S. Cl.
CPC ............ *H02M 7/44* (2013.01); *H02H 7/1227* (2013.01); *H02M 7/493* (2013.01); *H02H 7/1222* (2013.01)

(58) Field of Classification Search
CPC ........ H02M 7/49; H02M 7/493; H02M 7/497; H02M 3/285; H02M 1/36; H02J 3/46
See application file for complete search history.

(56) References Cited

U.S. PATENT DOCUMENTS 3,769,568 A * 10/1973 Hamilton ............ H02M 3/3378
363/25
3,798,530 A    3/1974 Henderson
(Continued)

FOREIGN PATENT DOCUMENTS

CN    103916038 A    7/2014
EP    0703652 A1    3/1996
(Continued)

OTHER PUBLICATIONS

Extended European Search Report corresponding to Application No. 15190725.0-1806/3024134; Date of Mailing: Jul. 4, 2016.

*Primary Examiner* — Gary L Laxton
(74) *Attorney, Agent, or Firm* — Cantor Colburn LLP

(57) ABSTRACT

Provided are a parallel inverter system, and a shutdown control method and a shutdown control device for the parallel inverter system. A shutdown instruction is determined and responded according to a level of the shutdown instruction. The shutdown instruction is determined to be an emergency shutdown instruction under certain emergency shutdown conditions, and a driving signal for the power switch devices of the inverter apparatus is needed to be instantly locked out. The shutdown instruction is determined to be a normal shutdown instruction under non-emergency shutdown conditions, a switch-off signal is transmitted to alternating-current switches connected to the inverter apparatus to be shut down, states of the alternating-current switches connected to the inverter apparatus to be shut down are detected, the driving signal for the power switch devices of the inverter apparatus to be shut down is instantly locked out in a case that the alternating-current switches are switched off.

17 Claims, 6 Drawing Sheets

(51) Int. Cl.
 *H02M 7/44* (2006.01)
 *H02H 7/122* (2006.01)

(56) References Cited

U.S. PATENT DOCUMENTS

| | | | |
|---|---|---|---|
| 5,625,546 A | 4/1997 | Schaal | |
| 8,837,179 B2* | 9/2014 | Ishioka | H02M 7/493 363/65 |
| 2008/0049467 A1* | 2/2008 | Takayanagi | H02M 1/32 363/56.03 |
| 2013/0009580 A1 | 1/2013 | De Wergifosse | |

FOREIGN PATENT DOCUMENTS

| | | |
|---|---|---|
| EP | 2833540 A1 | 2/2015 |
| JP | 2005328637 A | 11/2005 |
| WO | 2013145262 A1 | 10/2013 |

* cited by examiner

PARALLEL INVERTER SYSTEM, AND SHUTDOWN CONTROL METHOD AND SHUTDOWN CONTROL DEVICE FOR PARALLEL INVERTER SYSTEM

CROSS REFERENCE TO RELATED APPLICATIONS

The present invention claims priority under 35 U.S.C. §119 to Chinese Patent Application No. 201410577198.X filed Oct. 24, 2014, the entire content of which is incorporated herein by reference.

FIELD

The present disclosure relates to the technical field of power electronics, and more particularly to a parallel inverter system and a shutdown control method and a shutdown control device for the parallel inverter system.

BACKGROUND

In order to achieve the optimized configuration of inverter capability, especially in order to achieve a single machine with a high power as the power generation system capacity increases, the parallel of inverters becomes a technical development trend. The parallel of inverters has the following advantages: (1) it is convenient to enlarge the capacity of a grid-connected inverter; (2) the system cost is reduced due to devices sharing; (3) it is easy to realize group control, thereby increasing the system efficiency; and (4) for the MW-level parallel inverter system, a double-wound transformer instead of a double-split transformer may be used at the alternating-current side, thereby reducing the investment cost for the system.

In view of the above advantages, a parallel inverter system is widely used in a power station, especially in a new energy power generation system such as a photovoltaic power generation system. The ideal operating state of the parallel inverter system is that all of the inverter apparatuses in the parallel inverter system operate normally, but some abnormalities may occur due to various reasons. Taking a parallel inverter system including two inverter apparatuses as an example, in practice, one inverter apparatus may operate normally and the other inverter apparatus may be shut down due to a failure or other reasons, which causes the instability of the parallel inverter system.

Hence, it is a technical problem to be solved urgently by those skilled in the art that how to control some inverter apparatuses in the parallel inverter system to respond effectively in a case that the inverter apparatuses is needed to be shut down, so as to ensure the stable operation of the parallel inverter system.

SUMMARY

In view of this, a parallel inverter system and a shutdown control method and a shutdown control device for the parallel inverter system are provided, so that some inverter apparatuses in a parallel inverter system may respond effectively according to different levels of shutdown instructions in a case that the inverter apparatuses is needed to be shut down, and the normal operation of other inverter apparatuses is not affected, thereby ensuring the stable operation of the parallel inverter system.

A shutdown control method for a parallel inverter system is provided. The parallel inverter system includes at least two inverter apparatuses, alternating-current terminals of each of the at least two inverter apparatuses are connected to the alternating-current switches and then the at least two inverter apparatuses are connected in parallel, the parallel connection points are connected to an alternating-current load or an alternating-current power grid; and the shutdown control method includes:

obtaining a shutdown instruction;

determining a level of the shutdown instruction based on the obtained shutdown instructions;

controlling the inverter apparatus to be shut down and the alternating-current switches connected to the inverter apparatus to be shut down according to the level of the shutdown instruction.

The controlling the inverter apparatus to be shut down and the alternating-current switches connected to the inverter apparatus to be shut down according to the level of the shutdown instruction includes:

locking out instantly a driving signal for power switch devices of the inverter apparatus to be shut down in a case that the level of the shutdown instruction is determined to be an emergency level;

performing the following steps in a case that the level of the shutdown instruction is determined to be a normal level:

transmitting a switch-off signal to the alternating-current switches connected to the inverter apparatus to be shut down;

detecting whether the alternating-current switches connected to the inverter apparatus to be shut down are switched off, where the driving signal for the power switch devices of the inverter apparatus to be shut down is instantly locked out in a case that it is detected that the alternating-current switches connected to the inverter apparatus to be shut down are switched off.

The controlling the inverter apparatus to be shut down and the alternating-current switches connected to the inverter apparatus to be shut down according to the level of the shutdown instruction includes:

locking out instantly a driving signal for the power switch devices of the inverter apparatus to be shut down in a case that the level of the shutdown instruction is determined to be an emergency level;

performing the following steps in a case that the level of the shutdown instruction is determined to be a normal level:

transmitting a switch-off signal to the alternating-current switches connected to the inverter apparatus to be shut down, and starting a counter for counting simultaneously;

detecting whether the alternating-current switches connected to the inverter apparatus to be shut down are switched off or determining whether the counter counts to a set maximum value $T_{max}$; where the counter is cleared and the driving signal for the power switch devices of the inverter apparatus to be shut down is instantly locked out in a case that it is detected that the alternating-current switches connected to the inverter apparatus to be shut down are switched off or the counter counts to the set maximum value $T_{max}$.

The controlling the inverter apparatus to be shut down and the alternating-current switches connected to the inverter apparatus to be shut down according to the level of the shutdown instruction includes:

locking out instantly a driving signal for power switch devices of the inverter apparatus to be shut down in a case that the level of the shutdown instruction is determined to be an emergency level;

performing the following steps in a case that the level of the shutdown instruction is determined to be a normal level:

transmitting a switch-off signal to the alternating-current switches connected to the inverter apparatus to be shut down, and starting a counter for counting;

determining whether the counter counts to a set maximum value $T_{max}$, where the counter is cleared and the driving signal for the power switch devices of the inverter apparatus to be shut down is instantly locked out in a case that it is detected that the counter counts to the set maximum value $T_{max}$.

Specifically, the detecting whether the alternating-current switches connected to the inverter apparatus to be shut down are switched off includes determining whether the alternating-current switches are switched off by obtaining state signals of feedback contacts of the alternating-current switches connected to the inverter apparatus to be shut down.

Specifically, a period of time that the counter counts from zero to the set maximum value $T_{max}$ is not less than a period of time from the reception of the switch-off signals by the alternating-current switches to the switching off of the alternating-current switches under normal conditions.

Specifically, the shutdown control method further includes limiting an output current or an output power of the inverter apparatus to be shut down during the counting of the counter to switch off the alternating-current switches connected to the inverter apparatus to be shut down at zero current, in a case that the level of the shutdown instruction is determined to be the normal level.

Specifically, in a case that the inverter apparatus to be shut down is controlled using double closed loops, the limiting the output current or the output power of the inverter apparatus to be shut down to switch off the alternating-current switches connected to the inverter apparatus to be shut down at zero current includes: increasing a given value of a direct-current voltage loop, limiting an output of the direct-current voltage loop, and/or limiting a given value of a current loop.

Preferably, the switch-off signal is transmitted to the alternating-current switches connected to the inverter apparatus to be shut down while the driving signal for the power switch devices of the inverter apparatus to be shut down is instantly locked out, in a case that the level of the shutdown instruction is determined to be the emergency level.

A parallel inverter system is provided. The parallel inverter system includes at least two inverter apparatuses, the alternating-current terminals of each of the at least two inverter apparatuses are connected to the alternating-current switches and then the at least two inverter apparatuses are connected in parallel, the parallel connection points are connected to an alternating-current load or an alternating-current power grid; and the parallel inverter system further includes a shutdown control device, the shutdown control device includes: a shutdown instruction determination unit configured to determine a level of the shutdown instruction based on the obtained shutdown instruction; a shutdown controller configured to control the inverter apparatus to be shut down and the alternating-current switches connected to the inverter apparatus to be shut down according to the level of the shutdown instruction determined by the shutdown instruction determination unit.

The shutdown controller locks out instantly a driving signal a the power switch devices of the inverter apparatus to be shut down in a case that the level of the shutdown instruction is an emergency level; or the shutdown controller transmits a switch-off signal to the alternating-current switches connected to the inverter apparatus to be shut down in a case that the level of the shutdown instruction is a normal level.

The shutdown control device further includes a switch state detection circuit, and the switch state detection circuit is configured to detect state signals of the alternating-current switches connected to the inverter apparatus to be shut down and transmit the state signal to the shutdown controller or transmit only the state signal indicating that the alternating-current switches are switched off to the shutdown controller, in a case that the level of the shutdown instruction is determined to be the normal level; the shutdown controller locks out instantly the driving signal for the power switch devices of the inverter apparatus to be shut down once the shutdown controller receives the state signal indicating that the alternating-current switches are switched off.

The shutdown control device further includes a counter, and the counter is configured to perform counting while the shutdown controller transmits the switch-off signal to the alternating-current switches connected to the inverter apparatus to be shut down, in a case that the level of the shutdown instruction is determined to be the normal level; the counter is cleared and the shutdown controller locks out instantly the driving signal for the power switch devices of the inverter apparatus to be shut down once the counter counts to a set maximum value $T_{max}$.

The shutdown control device further includes a counter, and the counter is configured to perform counting while the shutdown controller transmits the switch-off signal to the alternating-current switches connected to the inverter apparatus to be shut down, in a case that the level of the shutdown instruction is determined to be the normal level; the counter is cleared and the shutdown controller locks out instantly the driving signal for the power switch devices of the inverter apparatus to be shut down once the shutdown controller receives the state signal indicating that the alternating-current switches are switched off or once the counter counts to a set maximum value $T_{max}$. The counter is cleared and the shutdown controller locks out instantly the driving signal for the power switch devices of the inverter apparatus to be shut down once it is detected by the switch state detection circuit that the alternating-current switches connected to the inverter apparatus to be shut down are switched off or once the counter counts to the set maximum value $T_{max}$.

The shutdown control device further includes a power limited unit configured to limit an output current or an output power of the inverter apparatus to be shut down during the counting of the counter to switch off the alternating-current switches connected to the inverter apparatus to be shut down at zero current.

A shutdown control device applied to the above-described parallel inverter system is further provided.

An inverter apparatus applied to the above-described parallel inverter system is further provided, and the shutdown control device described above is integrated into the inverter apparatus.

From the above technical solutions, the shutdown instruction is determined and responded according to the level of the shutdown instruction. The shutdown instruction is determined to be an emergency shutdown instruction under certain emergency shutdown conditions, and the driving signal for the power switch devices of the inverter apparatus is needed to be instantly locked out, so that the power switch devices can be quickly switched off, and the inverter apparatus to be shut down can be protected from being damaged. The shutdown instruction is determined to be a normal shutdown instruction under non-emergency shutdown conditions, the switch-off signal is transmitted to alternating-current switches connected to the inverter apparatus to be shut down, and states of the alternating-current switches connected to the inverter apparatus to be shut down are detected, the driving signal for the power switch devices of the inverter apparatus to be shut down is instantly locked out in a case that it is detected that the alternating-current switches are switched off. Therefore, the stable and safe operation of the parallel inverter system can be guaranteed maximally, and hazards due to circular currents can be prevented maximally. Moreover, in order to avoid delaying locking out the driving signal for the power switch devices due to the wrong detection of switch-off states of the alternating-current switches, the counter is started for counting while the switch-off signal is transmitted to the alternating-current switches connected to the inverter apparatus to be shut down in response to the normal shutdown instruction; once the counter counts to the set maximum value $T_{max}$ or once it is detected that the alternating-current switches connected to the inverter apparatus to be shut down are switched off, the driving signal for the power switch devices of the inverter apparatus to be shut down is locked out, thereby resulting in more reliable control, and ensuring the stable operation of the system.

BRIEF DESCRIPTION OF THE DRAWINGS

In order to illustrate technical solutions according to embodiments of the present disclosure or the conventional technology more clearly, the drawings to be used in the description of the embodiments or the conventional technology are described briefly as follows. It is apparent that the drawings referred in the following description only illustrate some embodiments of the present disclosure. For those skilled in the art, other drawings may be obtained according to these drawings without any creative work.

DETAILED DESCRIPTION

Figure 1A:
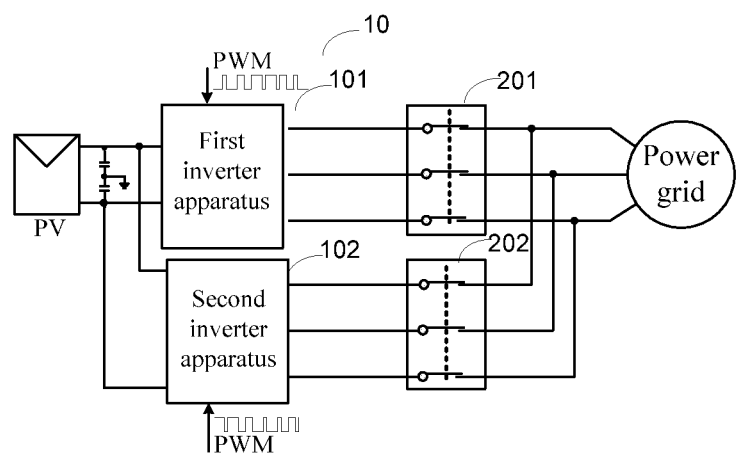
FIG. 1A is a schematic diagram showing the operation of a parallel inverter system according to an embodiment of the disclosure.

Technical solutions according to embodiments of the disclosure are described clearly and completely in conjunction with the drawings in the embodiments of the disclosure hereinafter. It is apparent that the described embodiments are only a few rather than all of the embodiments of the disclosure. All other embodiments obtained by those skilled in the art based on the embodiments of the disclosure without any creative work fall into the protective scope of the disclosure.

A parallel inverter system is provided according to an embodiment of the disclosure. The parallel inverter system includes at least two inverter apparatuses, the alternating-current terminals of each of the at least two inverter apparatuses are connected to the alternating-current switches and then the at least two inverter apparatuses are connected in parallel, the parallel connection points are connected to an alternating-current load or an alternating-current power grid. Taking a parallel inverter system with two inverter apparatuses in a first embodiment of the disclosure for example, referring to FIG. 1A, a parallel inverter system 10 includes a first inverter apparatus 101 and a second inverter apparatus 102, the direct-current terminals of the first inverter apparatus 101 and the direct-current terminals of the second inverter apparatus 102 are connected in parallel and then connected to the same direct-current power supply PV, the alternating-current terminals of the first inverter apparatus 101 are connected to first alternating-current switches 201, the alternating-current terminals of the second inverter apparatus 102 are connected to second alternating-current switches 202; a parallel connection manner is applied at the direct-current side and the alternating-current side of the inverter apparatuses in the parallel inverter system 10.

Figure 1B:
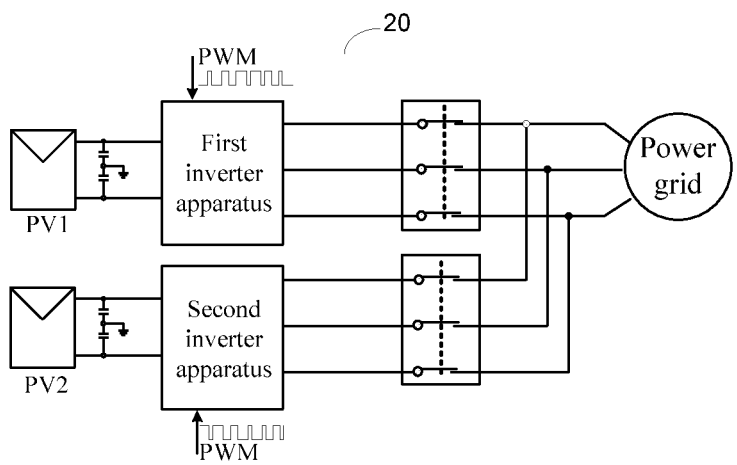
FIG. 1B is a schematic diagram showing the operation of a parallel inverter system according to an embodiment of the disclosure.

The parallel inverter system 20 in FIG. 1B is distinguished from the parallel inverter system 10 in FIG. 1A in that only the alternating-current terminals are connected in parallel in the parallel inverter system 20, that is, the alternating-current terminals of the first inverter apparatus 101 and the alternating-current terminals of the second inverter apparatus 102 are respectively connected in parallel via the alternating-current switches, the direct-current terminals of the first inverter apparatus 101 and the direct-current terminals of the second inverter apparatus 102 are not connected in parallel, but are respectively connected to different direct-current power supplies PV1 and PV2.

It should be noted that the direct-current power supply may be a solar cell panel or a storage battery.

From FIG. 1A and FIG. 1B, for either the parallel inverter system 10 with both the direct-current terminals and the alternating-current terminals in parallel connection manner, or the parallel inverter system 20 with only the alternating-current terminals in parallel connection manner, in the normal operation, the power switch devices of the inverter apparatus may receive a driving signal (for example, a PWM driving signal) to be switched on or off in combination, and thus a current required by an alternating-current load or an alternating-current power grid is generated at the alternating-current terminals of the inverter apparatus.

It should be noted that, the power switch devices of the inverter apparatus according to the embodiments of the disclosure refer to a combination of switch devices in a power conversion circuit (that is, a main topology circuit) in the inverter apparatus, including multiple switch devices.

Figure 2:
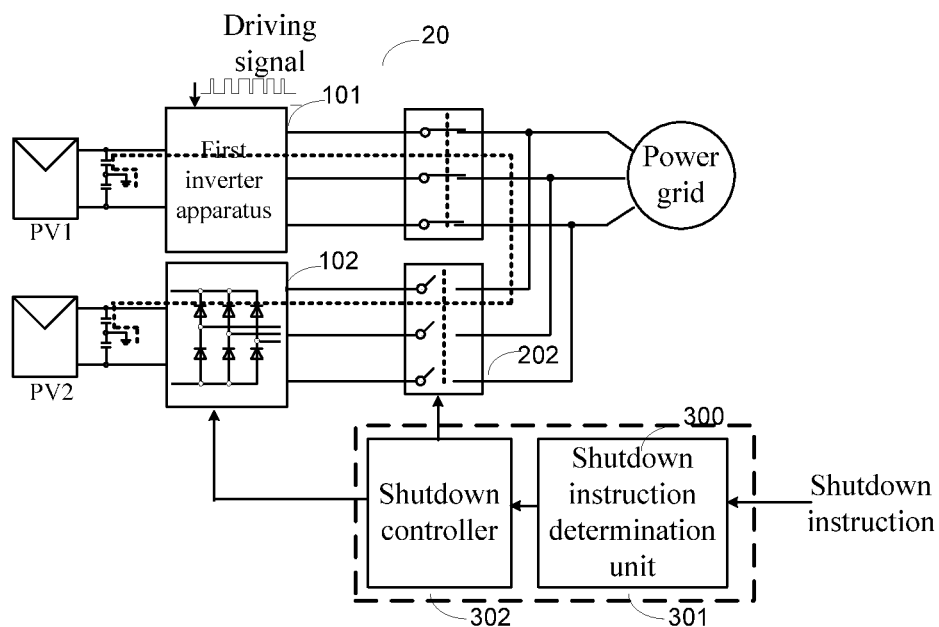
FIG. 2 is a schematic diagram showing the operation of a parallel inverter system according to an embodiment of the disclosure.

Referring to FIG. 2, taking the second inverter apparatus 102 as the inverter apparatus to be shut down for illustration, the parallel inverter system 20 further includes a shutdown control device 300. The shutdown control device 300 includes a shutdown instruction determination unit 301 and a shutdown controller 302. The shutdown instruction determination unit 301 is configured to determine a level of a shutdown instruction based on the obtained shutdown instruction; the shutdown controller 302 is configured to control the inverter apparatus to be shut down 102 and the alternating-current switches 202 connected to the inverter apparatus to be shut down 102 according to the level of the shutdown instruction determined by the shutdown instruction determination unit 301.

It should be noted that, the shutdown instruction may be obtained via an external input or an internal feedback. The external input for shutdown includes a button, a key of upper computer, and a message; and the internal feedback is mainly obtained when a failure of the inverter apparatus is detected.

Specifically, the parallel inverter system further includes a shutdown instruction obtaining unit configured to obtain a shutdown instruction derived from the external input or internal feedback and transmit the shutdown instruction to the shutdown instruction determination unit.

In a case that the parallel inverter system according to the embodiment of the disclosure fails or some inverter apparatuses are needed to be shut down due to an external control instruction, the inverter apparatus to be shut down may respond effectively according to different levels of shutdown instructions, and the normal operation of other inverter apparatuses is not affected, the stable operation of the parallel inverter system can be guaranteed.

Figure 3:
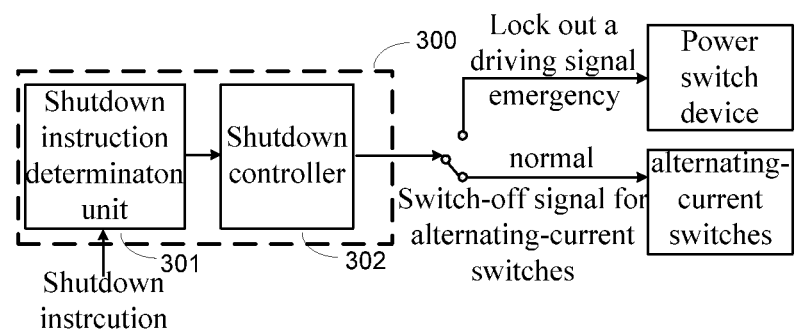
FIG. 3 is a schematic diagram showing a shutdown control device of a parallel inverter system according to an embodiment of the disclosure.

Referring to FIG. 3, the shutdown instruction determination unit 301 is configured to determine a level of a shutdown instruction based on the obtained shutdown instructions in a case that an inverter apparatus or several inverter apparatuses in a parallel inverter system is/are needed to be shut down. The shutdown controller 302 locks out instantly a driving signal for the power switch devices of the inverter apparatus to be shut down in a case that the level of the shutdown instruction is an emergency level; the shutdown controller 302 transmits a switch-off signal to the alternating-current switches connected to the inverter apparatus to be shut down in a case that the level of the shutdown instruction is a normal level.

Specifically, the shutdown instructions due to emergency failures such as over current, PDP protection are determined to be emergency shutdown instructions; and the non-emergency instructions due to fan failure, lightning arrester failure, or under-voltage of the power grid are determined to be normal shutdown instructions.

Figure 4A:
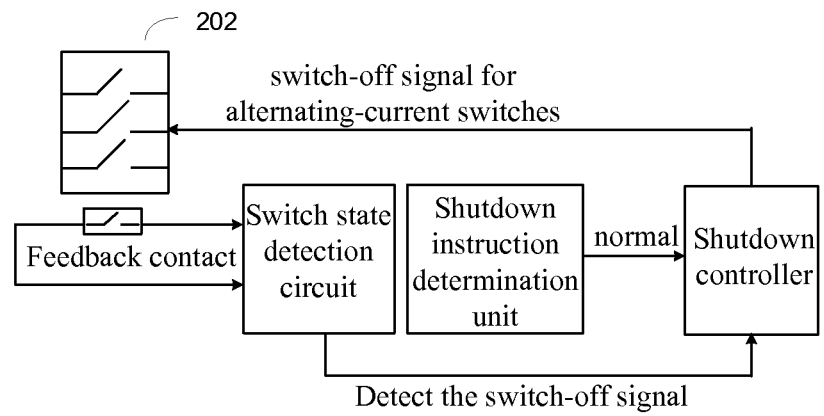
FIG. 4A is a schematic diagram showing a shutdown control device of a parallel inverter system according to an embodiment of the disclosure.

Referring to FIG. 4A, the shutdown control device 300 further includes a switch state detection circuit 303 configured to detect state signals of the alternating-current switches 202 connected to the inverter apparatus to be shut down and transmit the state signals to the shutdown controller 302 in a case that the level of the shutdown instruction is determined to be a normal level, the state signals include an ON state signal and an OFF state signal; or the switch state detection circuit 303 transmits only the state signal indicating that the alternating-current switches are switched off to the shutdown controller 302. The driving signal for the power switch devices of the inverter apparatus to be shut down is instantly locked out once the shutdown controller 302 receives the state signal indicating that the alternating-current switches are switched off.

Figure 4B:
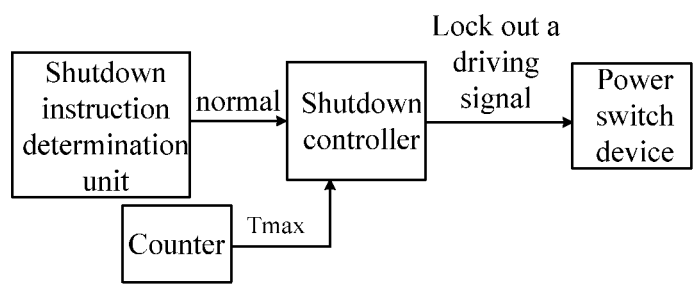
FIG. 4B is a schematic diagram showing a shutdown control device of a parallel inverter system according to an embodiment of the disclosure.

Referring to FIG. 4B, the shutdown control device 300 further includes a counter 304 configured to perform counting in a case that the level of the shutdown instruction is determined to be a normal level; the counter 304 is cleared and the shutdown controller 302 locks out instantly a driving signal for the power switch devices of the inverter apparatus to be shut down when the counter 304 counts to a set maximum value $T_{max}$.

Preferably, the shutdown control device 300 includes both a switch state detection circuit 303 and a counter 304. In a case that the level of the shutdown instruction is determined to be the normal level, the counter 304 perform counting, the switch state detection circuit 303 detects state signals of the alternating-current switches 202 connected to the inverter apparatus to be shut down and transmits the state signals or only the state signal indicating that the alternating-current switches are switched off to the shutdown controller 302. Once the shutdown controller 302 receives the state signal indicating that the alternating-current switches are switched off or once the counter counts to the set maximum value $T_{max}$, the counter 304 is cleared and the shutdown controller 302 locks out instantly the driving signal for the power switch devices of the inverter apparatus to be shut down.

Specifically, for the alternating-current switches with feedback contacts or auxiliary contacts, the switch state detection circuit 303 may obtain state signals of the alternating-current switches connected to the inverter apparatus to be shut down by detecting state signals of the feedback contacts or auxiliary contacts.

Specifically, a period of time that the counter counts from zero to the set maximum value $T_{max}$ is not less than a period of time from the reception of the switch-off signal by the alternating-current switches to the switching off of the alternating-current switches under normal conditions.

Figure 5:
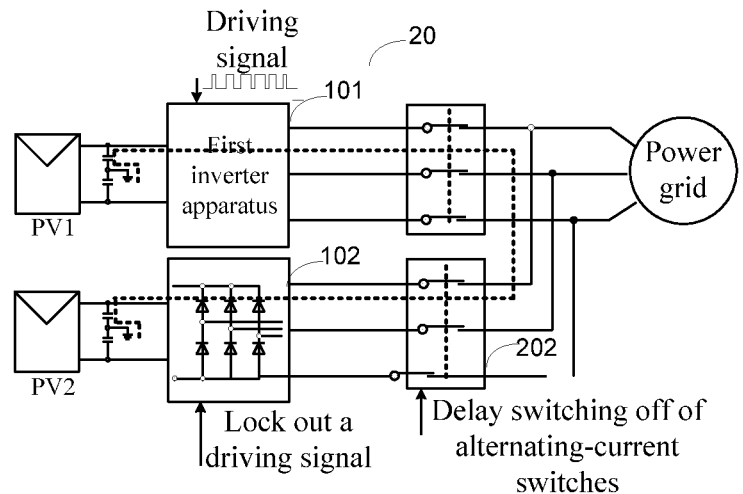
FIG. 5 is a schematic diagram of a circular current generated in a case that a power switch devices in a parallel inverter system is switched off firstly and alternating-current switches are switched off after a delay.

In order to better illustrate the advantages and effects of the disclosure, FIG. 5 shows a circular current path (as shown in the dashed line) generated in a case that the power switch devices of the inverter apparatus to be shut down 102 are switched off on receiving an instruction of locking out a driving signal and the alternating-current switches 202 are still in the ON state since the alternating-current switches 202 are switched off after a delay. In practice, there is a delay between the reception of the switch-off signals by the alternating-current switches and the actual switching off of the alternating-current switches, the alternating-current switches connected to the inverter apparatus to be shut down are still in the ON state after the power switch devices of the inverter apparatus to be shut down are switch off. Therefore, the current in the operating inverter apparatus flows through the alternating-current switches connected to the inverter apparatus to be shut down, the diodes from the power switch devices and the direct-current-side filters of the inverter apparatus to be shut down, and/or the parasitic capacitance of the battery to ground; and thus a circular current is generated, a high common-mode current is induced, the safe and stable operation of the inverter apparatus is severely affected, and the stability of the parallel inverter system is affected.

Referring to FIGS. 4A and 4B, in the embodiments of the disclosure, in a case that a normal shutdown condition occurs, the shutdown controller 302 transmits the switch-off signal to the alternating-current switches 202 connected to the inverter apparatus to be shut down 102, the shutdown controller 302 locks out instantly the driving signal for the power switch devices of the inverter apparatus to be shut down once the switch state detection circuit 303 detects that the alternating-current switches 202 connected to the inverter apparatus to be shut down 102 are in the OFF state or once the counter 304 counts to a value when the alternating-current switches may be switched off under normal conditions. The driving signal for the power switch devices of the inverter apparatus to be shut down is needed to be instantly locked out in a case that an emergency shutdown condition occurs due to an over-current failure; otherwise, the power switch devices may be damaged.

From the above technical solutions, the shutdown instruction is determined and responded according to the level of the shutdown instruction. The shutdown instruction is determined to be the emergency shutdown instruction under certain emergency shutdown conditions, and the driving signal for the power switch devices of the inverter apparatus is needed to be instantly locked out, so that the power switch devices can be quickly switched off, and the inverter apparatus to be shut down can be protected from being damaged. The shutdown instruction is determined to be the normal shutdown instruction under non-emergency shutdown conditions, the switch-off signal is transmitted to alternating-current switches connected to the inverter apparatus to be shut down, and states of the alternating-current switches connected to the inverter apparatus to be shut down are detected, the driving signal for the power switch devices of the inverter apparatus to be shut down is instantly locked out in a case that it is detected that the alternating-current switches are switched off. Therefore, the stable and safe operation of the parallel inverter system can be guaranteed maximally, and hazards due to circular currents can be prevented maximally. Moreover, in order to avoid delaying locking out the driving signal for the power switch devices due to the wrong detection of switch-off states of the alternating-current switches, the counter is started for counting while the switch-off signal is transmitted to the alternating-current switches connected to the inverter apparatus to be shut down in response to the normal shutdown instruction; once the counter counts to the set maximum value $T_{max}$ or once it is detected that the alternating-current switches connected to the inverter apparatus to be shut down are switched off, the driving signal for the power switch devices of the inverter apparatus to be shut down is locked out, thereby resulting in more reliable control, and ensuring the stable operation of the system.

Preferably, the shutdown control device further includes a power limited unit, and the power limited unit is configured to limit an output current or output power of the inverter apparatus to be shut down during the counting of the counter to switch off the alternating-current switches connected to the inverter apparatus to be shut down at zero current; therefore, the alternating-current switches can be switched off at zero current, the operation of the alternating-current switches at a high current is avoided, and the service life of the alternating-current switches is prolonged.

It should be noted that, the shutdown controller and the counter described in the above embodiments may be stand-alone devices, or may be integrated into the controller of the inverter apparatus or integrated into the centralized controller of the parallel inverter system.

Figure 9:
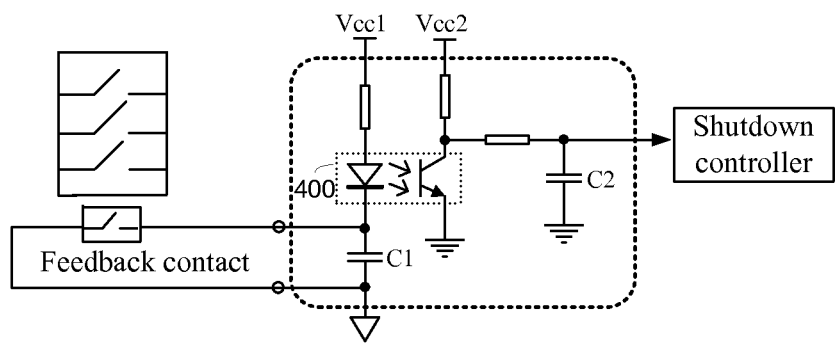
FIG. 9 is a circuit diagram of a switch state detection circuit according to an embodiment of the disclosure.

Referring to FIG. 9, a specific switch state detection circuit is provided according to an embodiment of the disclosure. The switch state detection circuit includes an optical coupler 400 and a capacitor C1, and the capacitor C1 is connected between two terminals of a feedback contact of the alternating-current switches. In a case that the alternating-current switches are in the OFF state, the optical coupler 400 is turned off, the shutdown controller is connected to Vcc2, a high electric level is received; in a case that the alternating-current switches are in the ON state, the capacitor C1 is bypassed, the optical coupler 400 is turned on, the shutdown controller is grounded, a low electric level is received. It should be noted that, other implementations of the switch state detection circuit are available, and the implementations in which the switch states can be detected are within the protective scope of the disclosure.

A shutdown control device applied to a parallel inverter system is provided according to an embodiment of the disclosure, and the specific implementations and functions of the shutdown control device are described in the above embodiments of the parallel inverter system. The shutdown control device according to the embodiment of the disclosure may be a stand-alone device or may be integrated into the inverter apparatus as a part of the inverter apparatus.

An inverter apparatus applied to a parallel inverter system is provided according to an embodiment of the disclosure, the inverter apparatus includes the shutdown control device described in above embodiment.

It should be noted that, the inverter apparatus according to an embodiment of the disclosure may be three phase or single phase, and may use a two-level inverter circuit or a multi-level inverter circuit; which are not limited by the disclosure.

A shutdown control method applied to a parallel inverter system is provided according to an embodiment of the disclosure, the parallel inverter system includes at least two inverter apparatuses, the alternating-current terminals of each of the at least two inverter apparatuses are connected to the alternating-current switches and then the at least two inverter apparatuses are connected in parallel, the parallel connection points are connected to an alternating-current load or an alternating-current power grid, which is described in the above embodiments of the parallel inverter system.

Figure 6:
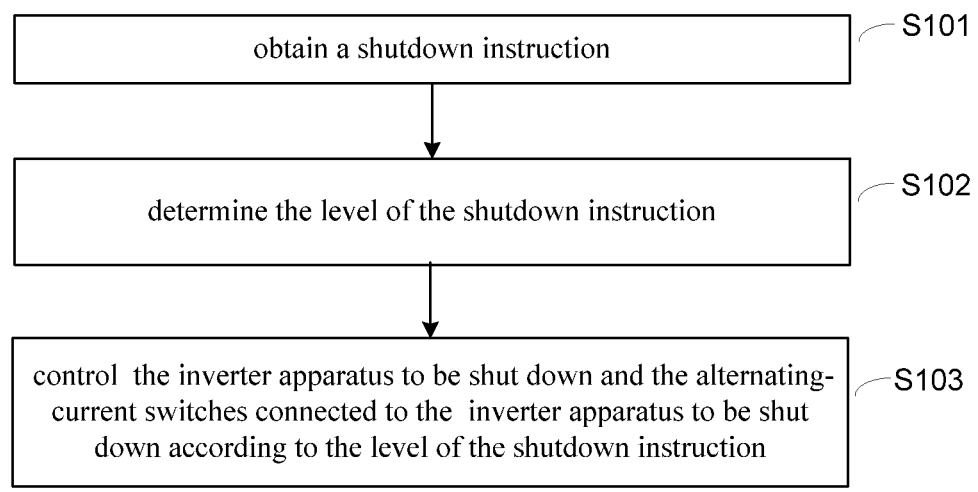
FIG. 6 is a schematic flow chart of a shutdown control method for a parallel inverter system according to an embodiment of the disclosure.

Referring to FIG. 6, in a first embodiment of a shutdown control method for a parallel inverter system according to the disclosure, the shutdown control method includes the following steps.

In step S101, a shutdown instruction is obtained.

In step S102, it is determined that a level of the shutdown instruction based on the obtained shutdown instruction.

In step S103, the inverter apparatus to be shut down and the alternating-current switches connected to the inverter apparatus to be shut down are controlled according to the level of the shutdown instruction.

In a case that some inverter apparatuses in the parallel inverter system according to the embodiment of the disclosure are needed to be shut down, the parallel inverter system may respond effectively according to different levels of shutdown instructions, and the normal operation of other inverter apparatuses is not affected, the stable operation of the parallel inverter system can be guaranteed.

Figure 7:
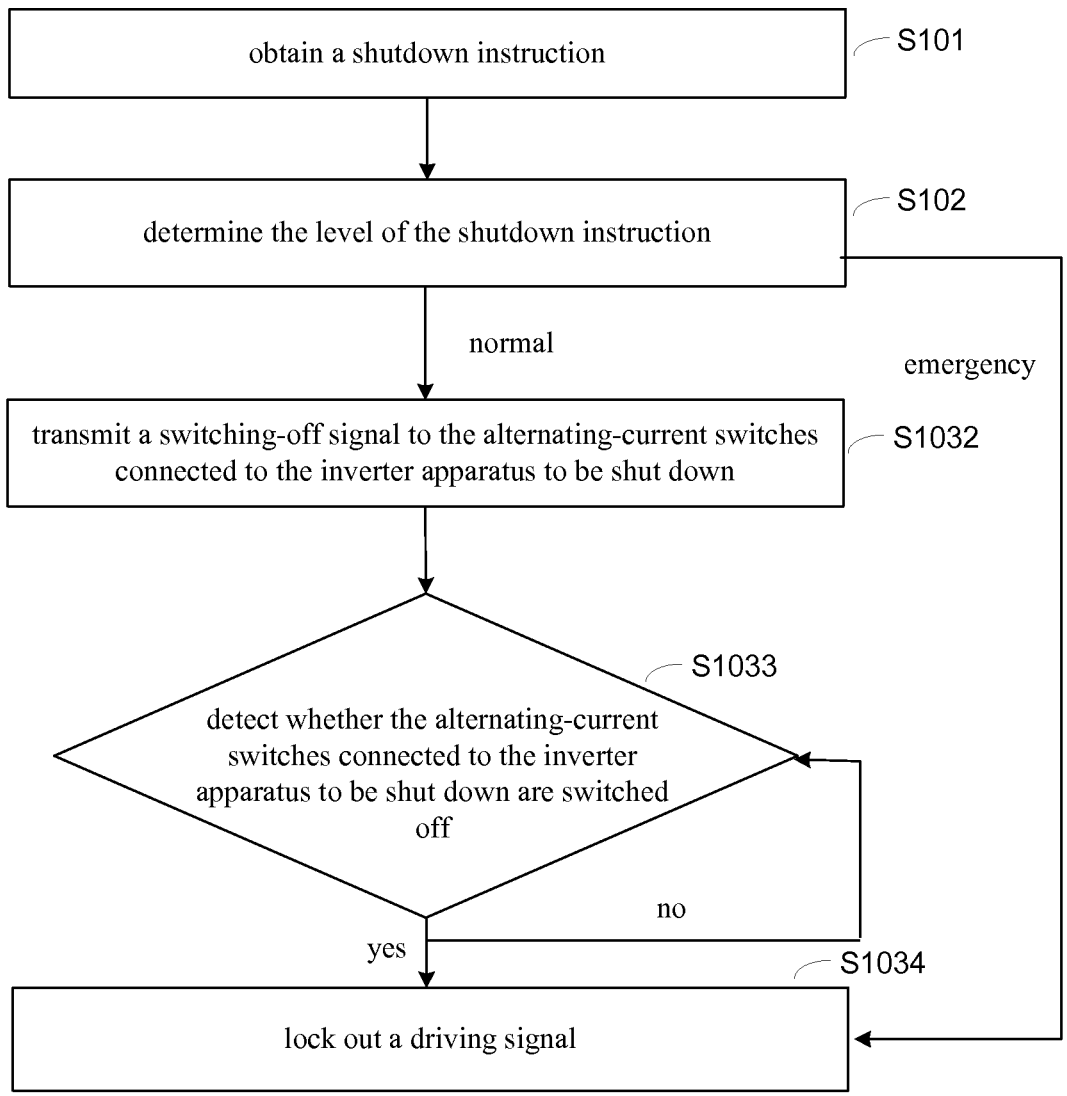
FIG. 7 is a schematic flow chart of a shutdown control method for a parallel inverter system according to an embodiment of the disclosure.

Referring to FIG. 7, in a second embodiment of a shutdown control method for a parallel inverter system according to the disclosure, the controlling the inverter apparatus to be shut down and the alternating-current switches connected to the inverter apparatus to be shut down according to the level of the shutdown instruction includes the following steps.

Step S1031 is performed in a case that the level of the shutdown instruction is determined to be an emergency level.

In step S1031, a driving signal for the power switch devices of the inverter apparatus to be shut down is locked out instantly.

Steps S1032, S1033 and S1034 are performed in a case that the level of the shutdown instruction is determined to be a normal level.

In step S1032, a switch-off signal is transmitted to the alternating-current switches connected to the inverter apparatus to be shut down.

In step S1033, it is detected whether the alternating-current switches connected to the inverter apparatus to be shut down are switched off. Step S1034 is performed if the alternating-current switches connected to the inverter apparatus to be shut down are switched off; or step S1033 is still performed.

Step S1034 is the same as step S1031.

Figure 8:
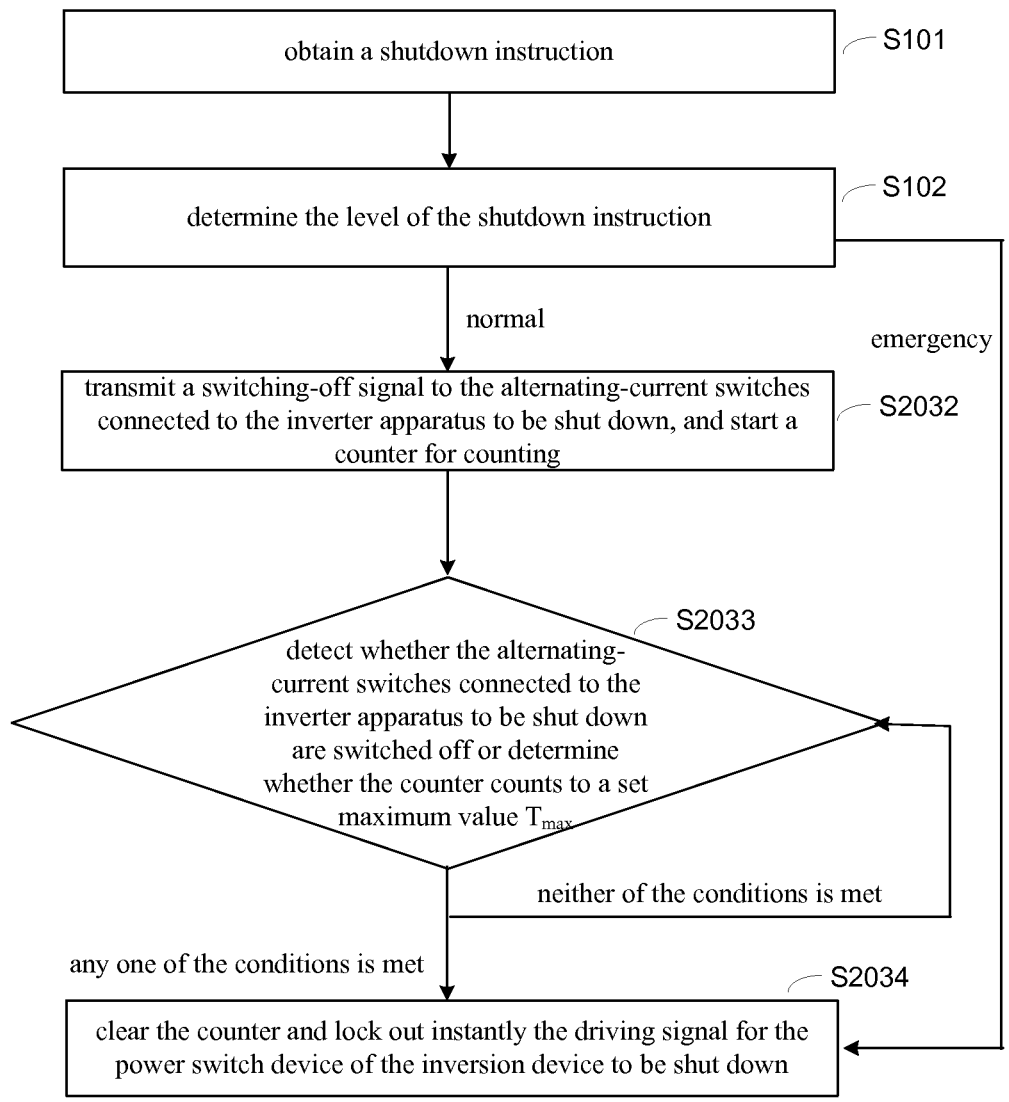
FIG. 8 is a schematic flow chart of a shutdown control method for a parallel inverter system according to an embodiment of the disclosure.

Referring to FIG. 8, in a third embodiment of a shutdown control method for a parallel inverter system according to the disclosure, the controlling the inverter apparatus to be shut down and the alternating-current switches connected to the inverter apparatus to be shut down according to the level of the shutdown instruction includes the following steps.

Step S2031 is performed in a case that the level of the shutdown instruction is determined to be an emergency level.

In step S2031, a driving signal for the power switch devices of the inverter apparatus to be shut down is locked out instantly.

Steps S2032, S2033 and S2034 are performed in a case that the level of the shutdown instruction is determined to be a normal level.

In step S2032, a switch-off signal is transmitted to the alternating-current switches connected to the inverter apparatus to be shut down, and a counter is started for counting.

In step S2033, it is detected whether the alternating-current switches connected to the inverter apparatus to be shut down are switched off or it is determined whether the counter counts to a set maximum value $T_{max}$; if it is detected that the alternating-current switches connected to the inverter apparatus to be shut down are switched off or the counter counts to the set maximum value $T_{max}$, step S2034 is performed; or step S2033 is still performed.

In step S2034, the counter is cleared and a driving signal for the power switch devices of the inverter apparatus to be shut down is locked out instantly.

Additionally, in a fourth embodiment of a shutdown control method for a parallel inverter system according to the disclosure, the controlling the inverter apparatus to be shut down and the alternating-current switches connected to the inverter apparatus to be shut down according to the level of the shutdown instruction includes the following steps.

In step S3031, a driving signal for the power switch devices of the inverter apparatus to be shut down is locked out instantly.

Steps S3032, S3033 and S3034 are performed in a case that the level of the shutdown instruction is determined to be a normal level.

In step S3032, a switch-off signal is transmitted to the alternating-current switches connected to the inverter apparatus to be shut down, and a counter is started for counting.

In step S3033, it is determined whether the counter counts to a set maximum value $T_{max}$. Step S3034 is performed if the counter counts to the set maximum value $T_{max}$; or step S3033 is still performed.

In step S3034, the counter is cleared and a driving signal for the power switch devices of the inverter apparatus to be shut down is locked out instantly.

Specifically, in the above embodiments of the shutdown control method, the detecting whether the alternating-current switches connected to the inverter apparatus to be shut down are switched off may be achieved by detecting the state signals of the feedback contacts of the alternating-current switches.

Specifically, a period of time that the counter counts from zero to the set maximum value $T_{max}$ is not less than a period of time from reception of the switch-off signals by the alternating-current switches to the switching off of the alternating-current switches under normal conditions.

It should be noted that, the power switch devices described in all embodiments of the disclosure are switch devices of the voltage conversion circuit in the inverter apparatus.

From the above technical solutions, the shutdown instructions is determined and responded according to the level of the shutdown instruction. The shutdown instruction is determined to be the emergency shutdown instruction under certain emergency shutdown conditions, and the driving signal for the power switch devices of inverter apparatuses is needed to be instantly locked out, so that the power switch devices can be quickly switched off, and the inverter apparatus to be shut down can be protected from being damaged. The shutdown instruction is determined to be the normal shutdown instruction under non-emergency shutdown conditions, the switch-off signal is transmitted to alternating-current switches connected to the inverter apparatus to be shut down, and states of the alternating-current switches connected to the inverter apparatus to be shut down are detected, the driving signal for the power switch devices of the inverter apparatus to be shut down is instantly locked out in a case that it is detected that the alternating-current switches are switched off. Therefore, the stable and safe operation of the parallel inverter system can be guaranteed maximally, and hazards due to circular currents can be prevented maximally. Moreover, in order to avoid delaying locking out the driving signal for the power switch devices due to the wrong detection of switch-off states of the alternating-current switches, the counter is started for counting while the switch-off signal is transmitted to the alternating-current switches connected to the inverter apparatus to be shut down in response to the normal shutdown instruction; once the counter counts to the set maximum value $T_{max}$ or once it is detected that the alternating-current switches connected to the inverter apparatus to be shut down is switched off, the driving signal for the power switch devices of the inverter apparatus to be shut down is locked out, thereby resulting in more reliable control, and ensuring the stable operation of the system.

Preferably, the output current or output power of the inverter apparatus to be shut down is limited during the counting of the counter to switch off the alternating-current switches connected to the inverter apparatus to be shut down at zero current, in a case that the level of the shutdown instruction is determined to be the normal level; therefore, the alternating-current switches can be switched off at zero current, the operation of the alternating-current switches at a high current is avoided, and the service life of the alternating-current switches is prolonged.

Specifically, for the inverter apparatus to be shut down controlled using double closed loops, the limiting output current or output power of the inverter apparatus to be shut down to switch off the alternating-current switches connected to the inverter apparatus to be shut down at zero current includes: increasing a given value of a direct-current voltage loop, limiting an output of the direct-current voltage loop, and/or limiting a given value of a current loop.

Preferably, the switch-off signal is transmitted to the alternating-current switches connected to the inverter apparatus to be shut down while the driving signal for the power switch devices of the inverter apparatus to be shut down is locked out, in a case that the level of the shutdown instruction is determined to be the emergency level.

The embodiments in the specification are described in a progressive manner, each embodiment focuses on a difference from other embodiments, and for a same or similar part, the embodiments may refer to each other. The device and system according to the embodiments correspond to the methods according to the embodiments and thus are described briefly, and for relevance, the method part may be referred to.

The above description of the embodiments of the disclosure is to enable those skilled in the art to practice or use the present disclosure. Multiple modifications made to these embodiments are apparent for those skilled in the art, and the general principles defined herein may be implemented in other embodiments without departing from the spirit or scope of the disclosure. Hence, the present disclosure is not limited to these embodiments disclosed herein, but is to conform to the widest scope consistent with the principles and novel features in the disclosure.

The invention claimed is:

1. A shutdown control method for a parallel inverter system, wherein the parallel inverter system comprises at least two inverter apparatuses, alternating-current terminals of each of the at least two inverter apparatuses are connected to alternating-current switches and then the at least two inverter apparatuses are connected in parallel, parallel connection points are connected to an alternating-current load or an alternating-current power grid; and the shutdown control method comprises:
obtaining a shutdown instruction;
determining a level of the shutdown instruction based on the shutdown instruction;
controlling an inverter apparatus to be shut down of the at least two inverter apparatuses and the alternating-current switches connected to the inverter apparatus to be shut down according to the level of the shutdown instruction,
wherein the controlling the inverter apparatus to be shut down and the alternating-current switches connected to the inverter apparatus to be shut down according to the level of the shutdown instruction comprises:
locking out instantly a driving signal for power switch devices of the inverter apparatus to be shut down in a case that the level of the shutdown instruction is determined to be an emergency level; and
transmitting a switch-off signal to the alternating-current switches connected to the inverter apparatus to be shut down to lock out the driving signal for the power switch devices of the inverter apparatus to be shut down, in a case that the level of the shutdown instruction is determined to be a normal level.

2. The shutdown control method according to claim 1;
in a case that the level of the shutdown instruction is determined to be the normal level, the method further comprises:
detecting whether the alternating-current switches connected to the inverter apparatus to be shut down are switched off, wherein the driving signal for the power switch devices of the inverter apparatus to be shut down is instantly locked out in a case of detecting that the alternating-current switches connected to the inverter apparatus to be shut down are switched off.

3. The shutdown control method according to claim 1, wherein in a case that the level of the shutdown instruction is determined to be the normal level, the method further comprises:
starting a counter for counting while transmitting a switch-off signal to the alternating-current switches connected to the inverter apparatus to be shut down; and
detecting whether the alternating-current switches connected to the inverter apparatus to be shut down are switched off or determining whether the counter counts to a set maximum value $T_{max}$, wherein the counter is cleared and the driving signal for the power switch devices of the inverter apparatus to be shut down is instantly locked out in a case of detecting that the alternating-current switches connected to the inverter apparatus to be shut down are switched off or the counter counts to the set maximum value $T_{max}$.

4. The shutdown control method according to claim 1, wherein in a case that the level of the shutdown instruction is determined to be the normal level, the method further comprises:
starting a counter for counting while transmitting a switch-off signal to the alternating-current switches connected to the inverter apparatus to be shut down; and
determining whether the counter counts to a set maximum value $T_{max}$, wherein the counter is cleared and the driving signal for the power switch devices of the inverter apparatus to be shut down is instantly locked out in a case of detecting that the counter counts to the set maximum value $T_{max}$.

5. The shutdown control method according to claim 2, wherein the detecting whether the alternating-current switches connected to the inverter apparatus to be shut down are switched off comprises determining whether the alternating-current switches are switched off by obtaining state signals of feedback contacts of the alternating-current switches connected to the inverter apparatus to be shut down.

6. The shutdown control method according to claim 3, wherein a period of time that the counter counts from zero to the set maximum value $T_{max}$ is not less than a period of time from a reception of the switch-off signal by the alternating-current switches to switching off of the alternating-current switches under normal conditions.

7. The shutdown control method according to claim 3, further comprising: limiting an output current or an output power of the inverter apparatus to be shut down during the counting of the counter to switch off the alternating-current switches connected to the inverter apparatus to be shut down at zero current, in a case that the level of the shutdown instruction is determined to be the normal level.

8. The shutdown control method according to claim 7, wherein in a case that the inverter apparatus to be shut down is controlled using double closed loops, the limiting the output current or the output power of the inverter apparatus to be shut down to switch off the alternating-current switches connected to the inverter apparatus to be shut down at zero current comprises: increasing a given value of a direct-current voltage loop, limiting an output of the direct-current voltage loop, and limiting a given value of a current loop.

9. The shutdown control method according to claim 7, wherein in a case that the inverter apparatus to be shut down is controlled using double closed loops, the limiting the output current or the output power of the inverter apparatus to be shut down to switch off the alternating-current switches connected to the inverter apparatus to be shut down at zero current comprises: increasing a given value of a direct-current voltage loop, limiting an output of the direct-current voltage loop, or limiting a given value of a current loop.

10. The shutdown control method according to claim 2, wherein the switch-off signal is transmitted to the alternating-current switches connected to the inverter apparatus to be shut down while the driving signal for the power switch devices of the inverter apparatus to be shut down is instantly locked out, in a case that the level of the shutdown instruction is determined to be the emergency level.

11. A parallel inverter system comprising at least two inverter apparatuses, wherein alternating-current terminals of each of the at least two inverter apparatuses are connected to alternating-current switches and then the at least two inverter apparatuses are connected in parallel, parallel connection points are connected to an alternating-current load or an alternating-current power grid; the parallel inverter system further comprises a shutdown control device, and the shutdown control device comprises:
 a shutdown instruction determination unit configured to determine a level of a shutdown instruction based on the shutdown instruction;
 a shutdown controller configured to control an inverter apparatus to be shut down of the at least two inverter apparatuses and the alternating-current switches connected to the inverter apparatus to be shut down according to the level of the shutdown instruction determined by the shutdown instruction determination unit,
 wherein the shutdown controller locks out instantly a driving signal for power switch devices of the inverter apparatus to be shut down in a case that the level of the shutdown instruction is an emergency level; or the shutdown controller transmits a switch-off signal to the alternating-current switches connected to the inverter apparatus to be shut down to lock out the driving signal for the power switch devices of the inverter apparatus to be shut down in a case that the level of the shutdown instruction is a normal level.

12. The parallel inverter system according to claim 11, wherein the shutdown control device further comprises a switch state detection circuit, wherein the switch state detection circuit is configured to detect a state signal of the alternating-current switches connected to the inverter apparatus to be shut down, and transmit the state signal to the shutdown controller or transmit only the state signal indicating that the alternating-current switches are switched off to the shutdown controller, in a case that the level of the shutdown instruction is determined to be the normal level;
 the shutdown controller locks out instantly the driving signal for the power switch devices of the inverter apparatus to be shut down once the shutdown controller receives the state signal indicating that the alternating-current switches are switched off.

13. The parallel inverter system according to claim 11, wherein the shutdown control device further comprises a counter, wherein the counter is configured to perform counting while the shutdown controller transmits the switch-off signal to the alternating-current switches connected to the inverter apparatus to be shut down, in a case that the level of the shutdown instruction is determined to be the normal level;
 the counter is cleared and the shutdown controller locks out instantly the driving signal for the power switch devices of the inverter apparatus to be shut down once the counter counts to a set maximum value $T_{max}$.

14. The parallel inverter system according to claim 12, wherein the shutdown control device further comprises a counter, wherein the counter is configured to perform counting while the shutdown controller transmits the switch-off signal to the alternating-current switches connected to the inverter apparatus to be shut down, in a case that the level of the shutdown instruction is determined to be the normal level;
 the counter is cleared and the shutdown controller locks out instantly the driving signal for the power switch devices of the inverter apparatus to be shut down once the shutdown controller receives the state signal indicating that the alternating-current switches are switched off or once the counter counts to a set maximum value $T_{max}$;
 the counter is cleared and the shutdown controller locks out instantly the driving signal for the power switch devices of the inverter apparatus to be shut down once it is detected by the switch state detection circuit that the alternating-current switches connected to the inverter apparatus to be shut down are switched off or once the counter counts to the set maximum value $T_{max}$.

15. The parallel inverter system according to claim 13, wherein the shutdown control device further comprises a power limited unit configured to limit an output current or an output power during the counting of the counter to switch off the alternating-current switches connected to the inverter apparatus to be shut down at zero current.

16. A shutdown control device applied to a parallel inverter system, wherein the parallel inverter system comprising at least two inverter apparatuses, alternating-current terminals of each of the at least two inverter apparatuses are connected to alternating-current switches and then the at least two inverter apparatuses are connected in parallel, parallel connection points are connected to an alternating-current load or an alternating-current power grid; the parallel inverter system further comprises a shutdown control device, and the shutdown control device comprises:
 a shutdown instruction determination unit configured to determine a level of a shutdown instruction based on the shutdown instruction;
 a shutdown controller configured to control an inverter apparatus to be shut down of the at least two inverter apparatuses and the alternating-current switches connected to the inverter apparatus to be shut down according to the level of the shutdown instruction determined by the shutdown instruction determination unit,
 wherein the shutdown controller locks out instantly a driving signal for power switch devices of the inverter apparatus to be shut down in a case that the level of the shutdown instruction is an emergency level; or the shutdown controller transmits a switch-off signal to the alternating-current switches connected to the inverter apparatus to be shut down to lock out the driving signal for the power switch devices of the inverter apparatus to be shut down in a case that the level of the shutdown instruction is a normal level.

17. An inverter apparatus applied to a parallel inverter system, wherein the inverter apparatus comprising the shutdown control device according to claim 16.

* * * * *